United States Patent [19]

Ramaker et al.

[11] Patent Number: 5,388,607
[45] Date of Patent: Feb. 14, 1995

[54] CONTROL SYSTEM FOR SUPPLYING A GAS FLOW TO A GAS CONSUMPTION

[75] Inventors: Antonius E. T. J. Ramaker, The Hague; Leendert Wolters, Rhoon, both of Netherlands

[73] Assignee: Deltec Fuel Systems B.V., Rotterdam, Netherlands

[21] Appl. No.: 100,561

[22] Filed: Jul. 30, 1993

[30] Foreign Application Priority Data

Jul. 31, 1992 [NL] Netherlands ............... 9201391

[51] Int. Cl.$^6$ ............................................. G05D 7/06
[52] U.S. Cl. ..................................... 137/88; 137/487; 137/487.5; 251/905
[58] Field of Search ............. 137/487, 487.5, 88; 123/527; 251/905

[56] References Cited

U.S. PATENT DOCUMENTS

| | | | |
|---|---|---|---|
| 4,146,051 | 3/1979 | Sparks | 137/487.5 X |
| 4,277,832 | 7/1981 | Wong | 137/487 X |
| 4,545,009 | 10/1985 | Muraki et al. | |
| 4,796,651 | 1/1989 | Ginn et al. | 137/487.5 X |
| 5,129,418 | 7/1992 | Shimomura et al. | 137/487.5 X |
| 5,146,941 | 9/1992 | Statler | 137/487.5 X |

FOREIGN PATENT DOCUMENTS

| | | |
|---|---|---|
| 0077286 | 4/1983 | European Pat. Off. |
| 0420599 | 4/1991 | European Pat. Off. |

*Primary Examiner*—Gerald A. Michalsky
*Attorney, Agent, or Firm*—Bachman & LaPointe

[57] ABSTRACT

A control system for supplying a gas flow to a gas consumption apparatus, comprising a gas supply pipe which can be connected to the apparatus and which has an electrically controlled gas control valve, and an electronic control unit. The control unit comprises a mathematical module, model-related to the control valve, for adjusting the valve position, and the gas control valve has in-built sensors for gas variables and valve position, the control system adjusting the control valve in linear proportion to a desired gas-flow signal to be supplied to the control unit. The mathematical module comprises a flow submodule, a mechanical submodule and a valve-position submodule, and the flow submodule receives, at its inputs, the desired gas-flow signal and gas variables originating from the valve sensors and supplies, at its output, a signal relating to the through-flow area of the valve, to the mechanical submodule. Said mechanical submodule contains mechanical valve parameters processed therein and supplies, at its output, a valve-position signal to the valve-position submodule, which receives a position signal originating from the valve-position sensor. The valve sensors for the gas variables comprise a sensor for the gas inlet pressure, a sensor for the gas inlet temperature and a sensor for the gas pressure difference across the valve. The gas control valve is designed as a cylindrical hollow slide valve having central gas feed and lateral gas outlet with exponential flow profile, and is provided with an electromagnetic actuator having a wire coil wound on the valve slide in a permanent magnetic field.

7 Claims, 3 Drawing Sheets

CONTROL SYSTEM FOR SUPPLYING A GAS FLOW TO A GAS CONSUMPTION

BACKGROUND OF THE INVENTION

The invention relates to a control system for supplying a gas flow to a gas consumption apparatus, comprising a gas supply pipe which can be connected to the apparatus and which has an electrically controlled gas control valve, and an electronic control unit. Such a control system is disclosed in EP-A-0 077 286.

In a first embodiment of this known system, use is made of an electronic control regulation which adjusts the control valve on the basis of a signal representing the desired gas flow, and of a flow-rate or throughput sensor whose output signal is fed back as a correction to the electronic control system, which then readjusts the control valve. Apart from the fact that such throughput sensors are inaccurate and unreliable, this system is much too slow if fast response times are desired. In a second embodiment of this known system, use is made of a simple valve-positioning loop which operates the motor of the control valve on the basis of a composite input signal. The composite input signal essentially comprises a combination of inlet gas pressure and rotary speed of a gas engine. Corrections can be made thereto by means of a few less important variables, such as atmospheric pressure, air temperature and gas temperature. This last embodiment is less cumbersome and also operates more rapidly than the first embodiment but is insufficiently accurate. The object of the invention is therefore to eliminate the abovementioned problems.

Furthermore, in an application of such control systems, namely in gas injection systems fop gas combustion engines, the homogeneity of the gas/air mixture in the cylinders is of great importance in achieving as low as possible an emission of harmful substances. A requirement related thereto is a very accurate gas metering with rapid response to alterations in load and rotary speed. In practice, it is of exceptional importance to regulate the gas/air ratio extremely accurately in accordance with any desired curve during alteration from starting rotary speed to full load at maximum rotary speed. This should also be achieved with varying gas inlet pressures and temperatures. The known systems do not meet these requirements. The object of the invention is also to fulfill the latter.

SUMMARY OF THE INVENTION

This is achieved, according to the invention, with a control system of the type mentioned in the introduction in that the control unit comprises a mathematical module, model-related to the control valve, for adjusting the valve position and in that the gas control valve has inbuilt sensors for gas variables and valve position, the control system adjusting the control valve in linear proportion to a desired gas-flow signal to be supplied to the control unit.

The mathematical module mentioned comprises a flow submodule, a mechanical submodule and a valve-position submodule, wherein the flow submodule receives, at its inputs, the desired gas-flow signal and gas variables originating from the valve sensors and supplies, at its output a signal, relating to the through-flow area of the valve, to the mechanical submodule, and wherein the mechanical submodule contains mechanical valve parameters processed therein and supplies, at its output, a valve-position signal to the valve-position submodule, which receives a position signal originating from the valve-position sensor.

The desired gas-flow signal mentioned may originate from a main control system, such as the management system of a gas engine. The valve sensors, built into the gas control valve, for gas parameters comprise a sensor for the gas inlet pressure, a sensor for the gas inlet temperature, and a sensor for the gas pressure difference across the valve.

With this system according to the invention, it is possible to correct automatically for varying gas inlet pressures and temperatures. The system carries out this correction in an extremely rapid response even during alterations in loading of the consumption apparatus, and if the latter is a combustion device, during alterations in the rotary speed thereof. This is of importance as regards low fuel consumption and low emission of harmful substances.

BRIEF DESCRIPTION OF THE DRAWINGS

The invention will be explained in greater detail on the basis of an exemplary embodiment, with reference to the drawings, wherein.

DETAILED DESCRIPTION OF THE PREFERRED EMBODIMENT

Figure 1:
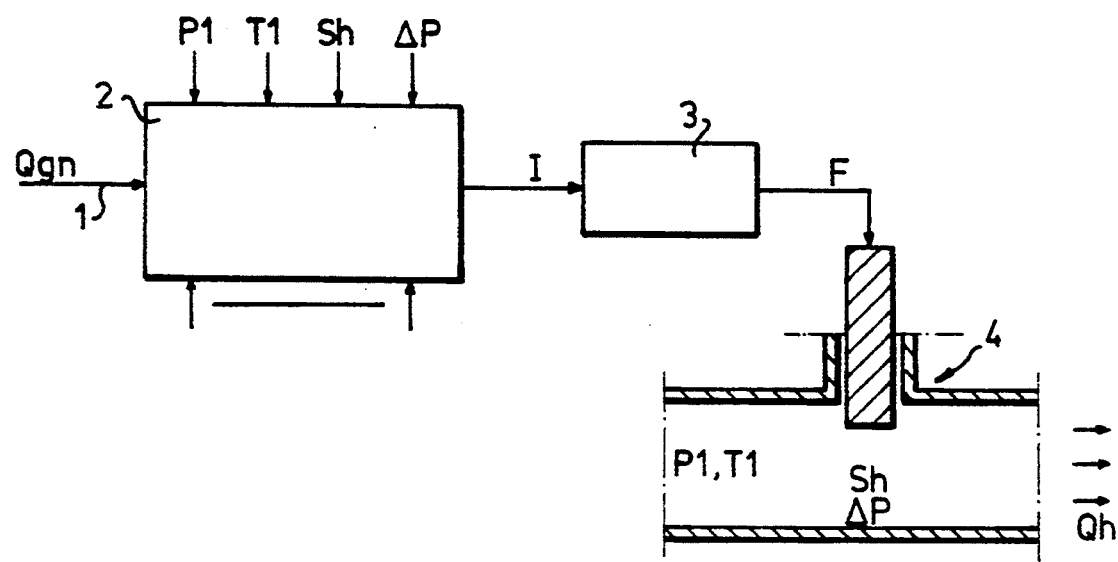
FIG. 1 shows a diagrammatic representation of the control system according to the invention.

FIG. 1 gives a very diagrammatic representation of the control system according to the invention, in which Qgn indicates a signal representing the desired gas flow, 2 indicates a mathematical module related to the control valve in terms of a model, 3 indicates an actuator associated with the control valve and 4 indicates diagrammatically the control valve. A gas flow, which is regulated by means of the valve to a gas flow Qh (Q prevailing) at the outlet side, is fed to the inlet side of the valve 4. A number of gas variables measured at the control valve, such as the gas inlet pressure P1, the gas inlet temperature T1, the gas pressure difference across the valve $\Delta P$ and the valve position Sh, are fed to the module 2. A number of gas parameters, such as standard gas density Gn, standard pressure Pn, standard temperature Tn, gas resistance coefficient $\lambda$ and mechanical valve constants b and k are also fed to the module 2. Via the output of the module, a certain control signal is fed to the electromechanical actuator 3 which, finally, exerts a force F on the slide of the control valve 4.

The gas flow in the outlet of the control valve can be adjusted in linear proportion to the desired gas-flow signal fed to the input with the aid of the abovementioned mathematical model-related module. In said module, an accurate mathematical model is implemented which describes the static and dynamic behaviour of the gas flow and the valve. After production, the model is matched once only to the physical model with the aid of a number of parameters which are determined separately in a measurement arrangement. With such a module, gas flows can then be adjusted in a control range of, for example, 0–75 $nm^3/h$ with a resolution of 0.02 $nm^3/h$, with an automatic correction of fluctuations in gas inlet pressure and temperature. In this connection, the control valve has three functions. The main function is the control mentioned of the outgoing gas flow. A further function is the complete or 100% shut-off during standstill of the consumption apparatus, such as a gas engine, if the latter is not using any gas. A further function is the shut-off of the gas flow during deceleration of the gas engine. Under these conditions, a minimum leakage of the gas flow is permissible.

Figure 2:
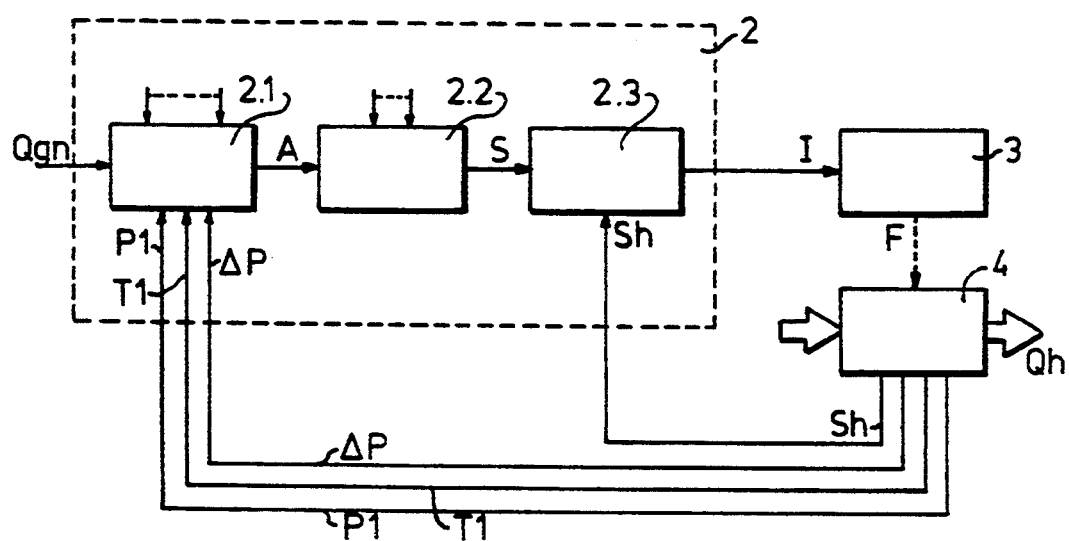
FIG. 2 shows a block diagram for explaining the representation of FIG. 1.

FIG. 2 shows the control system according to the invention in greater detail. The module 2 comprises a flow submodule 2.1, a mechanical submodule 2.2 and a position submodule 2.3. A signal representing the desired standard gas flow Qgn is fed to the submodule 2.1. This may originate from any main control system associated with the gas consumption apparatus. If a consumption apparatus which functions as a combustion device, such as a gas engine, is used, this is the signal representing the desired gas flow originating from the engine management system. The submodule 2.1 incorporates a flow model with which the through-flow area A of the gas control valve is determined in accordance with a certain function.

For applications involving fairly low gas pressures and flow velocities (so-called nonsonic), the starting point is an adiabatic behaviour of the gas flow and the fact that the gas velocity and the pressure differences are small, as a result of which the Bernoulli energy conservation law for liquids can also be applied to gases: namely $P1 + \frac{1}{2}\cdot\rho\cdot v_1^2 + \rho\cdot g\cdot h_1 = P2 + \frac{1}{2}\cdot\rho\cdot v_2^2 + \rho\cdot g\cdot h_2$. Here P1 and P2 are static pressures, $\rho$ is the gas density, v is the gas velocity, g is the acceleration due to gravity and h is the height. Since the process proceeds at constant height, $h_1 = h_2$. This term is therefore eliminated. The equation mentioned must be expanded since the through-flow from the inlet side to the outlet side is accompanied by energy loss in the form of friction. This energy loss can be determined in accordance with $\Delta P = \zeta \cdot \frac{1}{2}\cdot\rho\cdot v^2$, where $\Delta P$ static plus dynamic pressure difference and $\zeta$ = coefficient of resistance.

After substituting $v = Q/A$, where A is the through-flow area of the valve, and after some calculation, an expression for the gas flow results: $Qgn = A\cdot\sqrt{(2\Delta P/\rho\zeta)}$. Over a broad temperature range, the gas density $\rho$ is given by $\rho n \cdot (P1\cdot Tn/Pn\cdot T1)$, where $\rho n$ is the specific mass, Tn is the standard temperature and Pn is the standard pressure. After substitution, this gives for A:

$$A = Qgn \cdot \sqrt{\frac{Pn \cdot Ti}{P1 \cdot Tn}} \cdot \sqrt{\frac{\rho n \cdot \zeta}{2\Delta P}}$$

For applications involving higher gas pressures and flow velocities (so-called sonic) in which, for example, the Bernoulli law no longer holds true, other laws apply and another relationship can be derived for A.

The mechanical submodule 2.2 contains a mathematical mechanical model of the valve, with actuator and sensors. Since the through-flow ports of the control valve have an exponential behaviour, in order to obtain a constant relative error over the entire range, the through-flow aperture of the valve slide becomes a function of the valve position S in accordance with the following equation:

$$A(s) = k \cdot e^{b \cdot s}.$$

This then gives $S = (1/b)\cdot \ln(A/k)$, where k and b are mechanical constants which are dependent on the valve shape.

The module 2.2 supplies a signal S representing the valve position to the position submodule 2.3. This module, which also receives a signal Sh from the valve-position sensor which is proportional to the position of the valve slide, supplies, at its output, a control signal to the actuator.

The valve comprises a cylindrical hollow slide valve having a central gas inlet and lateral gas outlet with exponential flow profile. This gas control valve incorporates an electromagnetic actuator with a wire coil in a permanent magnetic field. The position regulation of this electromechanical actuator, which operates the stroke of the valve slide, is a second-order mechanical mass-spring system. In order to obtain a force F generated by the actuator, the coil must be controlled by a current or voltage signal. For current control, we can write $F_{coil}$ = constant·I for the latter.

Figure 3:
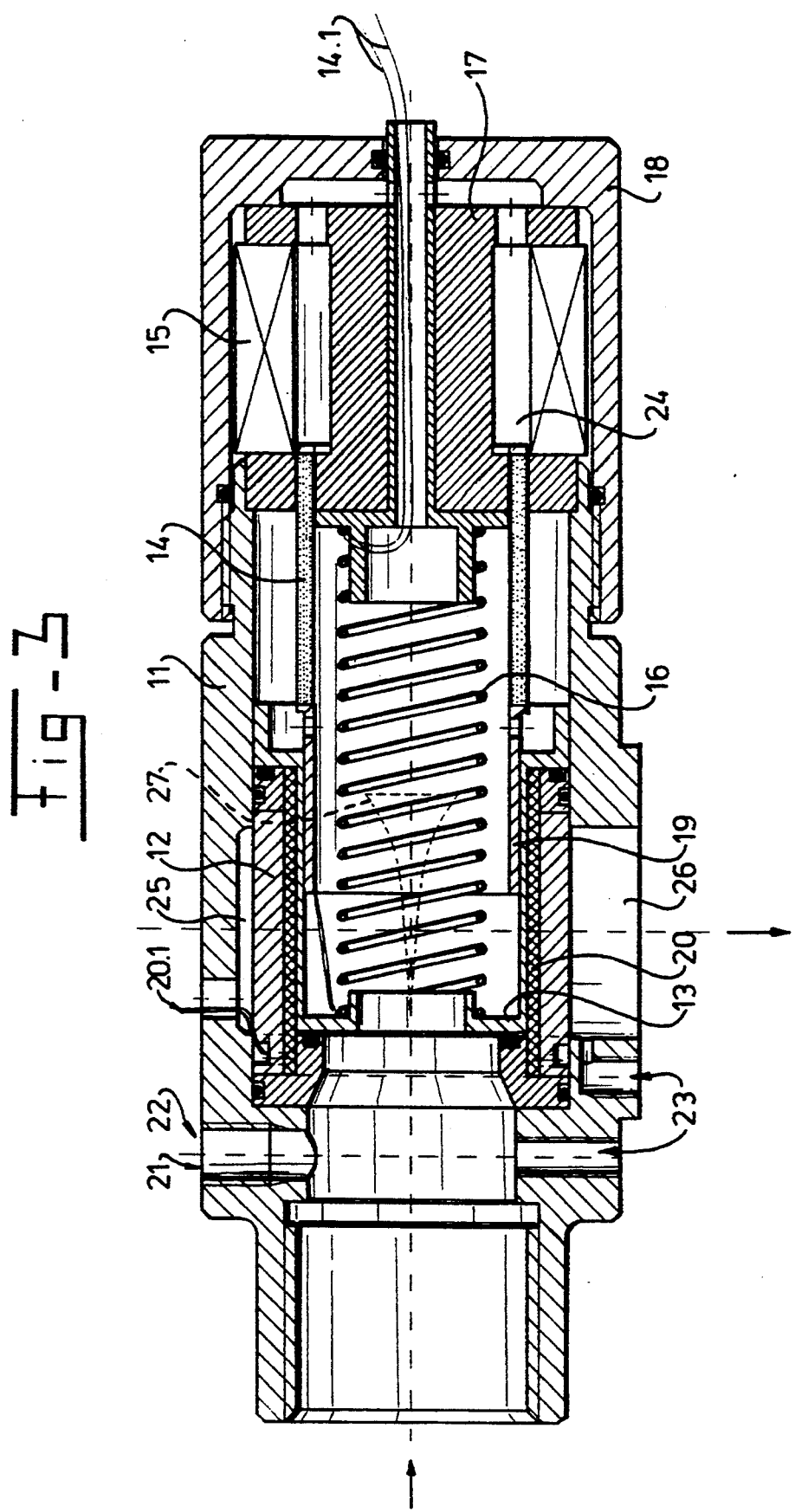
FIG. 3 shows an embodiment of the control valve.

In FIG. 3, an embodiment is given as an example of the gas control valve. In this figure, 11 indicates the valve housing, 12 the profiled sleeve, 13 the valve slide, 14 the wire-wound coil and 14.1 the connections thereof, 15 the permanent magnet, 16 a spring, 17 a number of field conductors, 18 the magnetic casing, 19 the coil form, 20 the position sensor and 20.1 the connections thereof, 21 the sensor for the gas inlet pressure P1, 22 the sensor for the gas inlet temperature T1 and 23 the sensor for the gas differential pressure $\Delta P$.

As stated, the actuator incorporated in the abovementioned gas control valve comprises a wire coil 14 and a permanent magnet 15. The coil is partly in a narrow air gap 24 in which very high magnetic flux density prevails. This is achieved by guiding the magnetic field of the magnet with the aid of iron conductors 17 and concentrating it in the air gap. If the coil is energized with a current, said coil will experience a (Lorentz) force which is linearly proportional to the magnitude of the current, the flux density and the length of the coil which is situated in the field. The wire coil is wound round a thin plastic form 19 which is attached to the valve slide 13 to which the movement is transferred. Under these circumstances, said valve slide slides over both through-flow ports. As a result of reversing the current direction, the direction of the force will also reverse. When the coil moves inwards, towards the magnet in the drawing, the gas which is situated in that space will have to make room for the volume of the coil. The gas flow produced in this way may possibly be used partly to cool the wire coil. The gas flow entering on the left-hand side flows via two through-flow ports (not shown) situated opposite one another and parallel to the plane of the drawing into a circumferentially situated space 25 and passes to the outside via the outlet port 26. The two through-flow ports have, as stated, an exponential flow profile which is indicated as a dashed line by 27.

The diagrammatically indicated gas differential pressure sensor 23 measures the pressure difference across the valve. The response time of this sensor must be shorter than the full-stroke time of the valve slide. This is not more than 30 ms. The diagrammatically indicated temperature sensor 22 measures the absolute temperature of the gas, and the diagrammatically indicated pressure sensor measures the absolute pressure of the gas. The position sensor 20 accurately measures, in a way not indicated further, the position of the valve slide and converts it into an electrical signal Sh. This output signal must be linearly proportional to the position of the valve slide.

Figure 4:
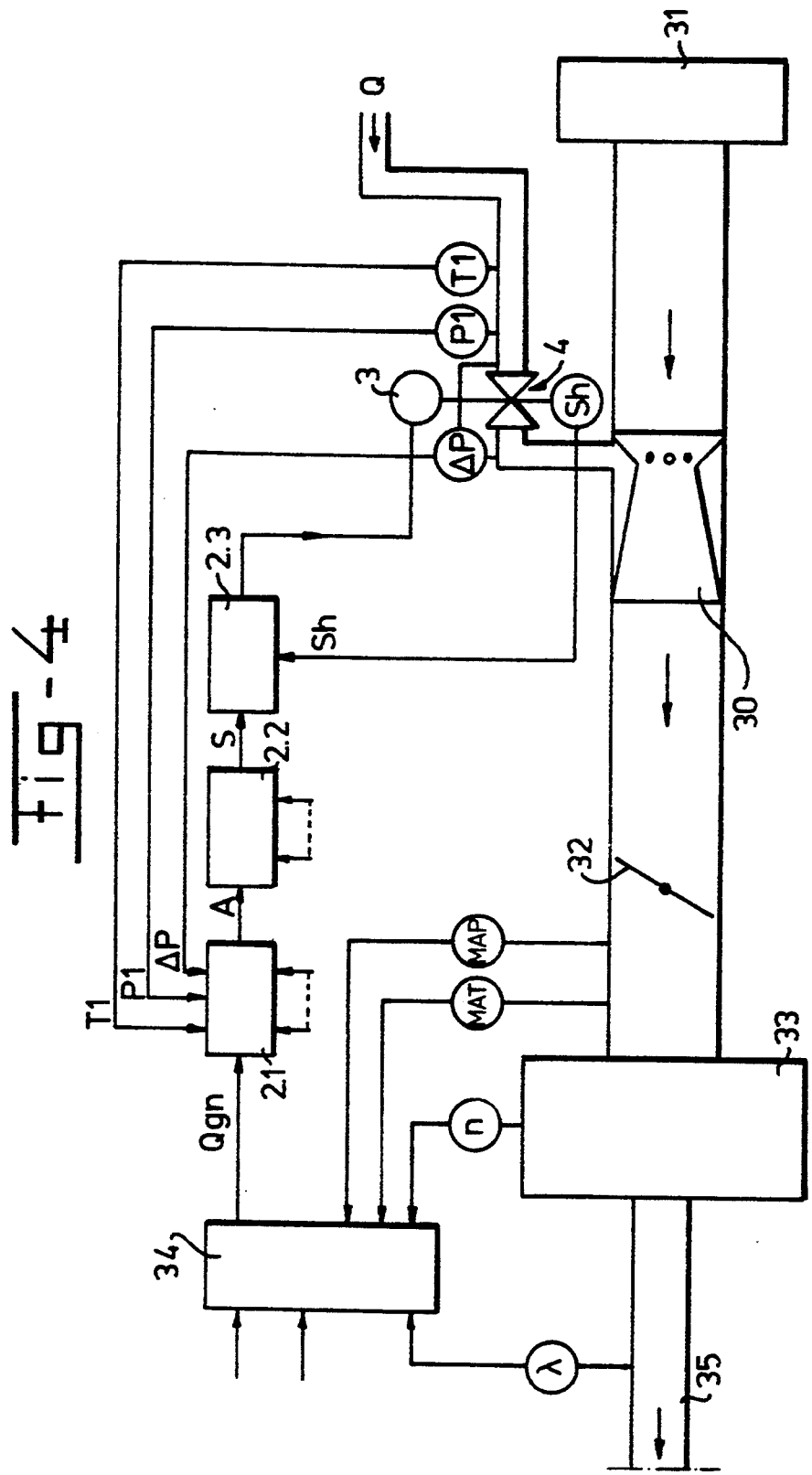
FIG. 4 shows an application of the control system of FIG. 2 in a combustion device, such as a gas engine.

FIG. 4 gives an example of an application of the gas control valve according to the invention for a gas/air mixer of a combustion device, such as a gas engine. In FIG. 4, the same components as those from FIGS. 1 to 3 are indicated by the same reference numerals.

30 indicates a gas/air mixer, such as a venturi mixing tube. Air supplied via an air filter 31 is fed to the inlet side thereof. From the outlet side of the mixer 30, an amount of gas/air mixture is fed via a throttle or mixing valve 32 to the gas engine 33.

From the gas engine, a number of variables such as, for example, rotary speed n, absolute inlet mixture temperature (MAT), absolute inlet mixture pressure (MAP), ignition data, are fed to the abovementioned main control or management system 34 of the engine. Such a system is able to determine a certain gas/air ratio for any loading and speed of the engine and supply for the latter a signal Qgn representing the desired gas flow. This signal Qgn, varying for example between 0 and 5 volts, will then be converted in the gas control system according to the invention in direct proportion into a gas flow of, for example, 0 to 75 nm³/h.

The abovementioned so-called open-loop or forward control of the management system can also operate in a closed-loop design. That is to say the desired gas flow signal to the gas control system will be corrected in such a way that the measured gas/air ratio is equal to the gas/air ratio of the engine map. The said engine map is a characteristics diagram of the engine and indicates the desired gas/air ratio (expressed as lambda) at a particular engine speed and a particular engine loading. With the aid of a special sensor, the so-called lambda sensor, in the outlet channel 35 of the engine, the prevailing gas/air ratio is detected. The open-loop control is used, for example, if no lambda sensor is used or if the lambda sensor is heating up or is defective.

What is claimed is:

1. A control system for supplying a gas flow to a gas consumption apparatus, comprising:
    a gas supply pipe adapted to be connected to the apparatus having an electrically controlled gas control valve;
    the gas control valve comprising in-built valve sensor means for sensing gas variables and valve position, a cylindrical hollow slide valve having a valve slide and including a central gas feed and a lateral gas outlet with an exponential flow profile and an electromagnetic actuator having a wire coil which is wound on the valve slide in a permanent magnetic field; and
    an electronic control unit comprising a mathematical module, model-related to the control valve, for adjusting the position of the control valve;
    wherein the control system is adapted to adjust the control valve in linear proportion to a desired gas-flow signal to be supplied to the control unit.

2. The control system according to claim 1, wherein the mathematical module comprises a flow submodule, a mechanical submodule and a valve-position submodule each having inputs and outputs, the flow submodule adapted to receive the desired gas-flow signal and gas variables originating from the valve sensor means at its inputs and the flow submodule adapted to supply a signal relating to the through-flow area of the valve at its output, wherein the through-flow area signal is directed to the mechanical submodule and the mechanical submodule is adapted to process mechanical valve parameters and supply a valve-position signal at its output which is adapted to be directed to the valve-position submodule which receives a position signal originating from the valve sensor means.

3. The control system according to claim 2, wherein the valve sensor means for sensing the gas variables comprise a sensor means for sensing gas inlet pressure, a sensor means for sensing gas inlet temperature and a sensor means for sensing gas pressure difference across the valve.

4. The control system according to claim 3, wherein the flow submodule is provided with calculation means in communication with and adapted to receive an inlet pressure signal from the sensor means for sensing the gas inlet pressure, the flow submodule being in communication with and adapted to receive an inlet temperature signal from the sensor means for sensing the gas inlet temperature, and the flow submodule being in communication with and adapted to receive a gas pressure difference signal from the sensor means for sensing the gas pressure difference across the valve, the calculation means adapted to generate a through-flow area signal for transmission to the mechanical submodule, wherein the through-flow area signal is determined in accordance with the following equation:

$$A = Qgn \cdot \sqrt{\frac{Pn \cdot T1}{P1 \cdot Tn}} \cdot \sqrt{\frac{\rho n \cdot \zeta}{2\Delta P}}$$

where
A = through-flow area,
Qgn = desired gas flow,
P1 = inlet pressure of the gas,
T1 = inlet temperature of the gas,
ΔP = differential gas pressure across the valve,
Pn = standard pressure of the gas,
Tn = standard temperature of the gas,
ρ = specific mass,
ζ = coefficient of gas resistance.

5. A control system according to claim 4, wherein the mechanical submodule is provided with further calculation means for receiving the through-flow area signal from the flow submodule and for generating the valve position signal in accordance with the following equation:

$$S = (1/b) \cdot \ln(A/k),$$

where
S = valve position,
b = mechanical parameter,
k = mechanical parameter.

6. A gas control assembly for use with a gas combustion engine, comprising:
    a control system including a gas supply pipe adapted to be connected to the engine having an electrically controlled gas control valve, the gas control valve comprising in-built valve sensor means for sensing gas variables and valve position, a cylindrical hollow slide valve having a valve slide and including a central gas feed and a lateral gas outlet with an exponential flow profile and an electromagnetic actuator having a wire coil wound on the valve slide in a permanent magnetic field, an electronic control unit comprising a mathematical module, model-related to the control valve, for adjusting the position of the control valve wherein the control system is adapted to adjust the control valve in linear proportion to a desired gas-flow signal to be supplied to the control unit;

a gas/air mixer, wherein the lateral gas outlet of the gas control valve is connected to the gas/air mixer and the gas/air mixer is connected to an air inlet conduit means for supplying a gas/air mixture to the gas combustion engine;

sensor means for detecting a rotary speed of the gas combustion engine;

a sensor means for detecting an inlet temperature of the gas/air mixture to the gas combustion engine;

a sensor means for detecting an inlet pressure of the gas/air mixture to the gas combustion engine; and the assembly including at least one input for receiving the desired gas flow signals including the sensed rotary speed, inlet temperature and pressure and at least one output for providing the desired gas flow signals to the control system.

7. The control assembly according to claim 6, further comprising a sensor means for detecting a prevailing gas/air ratio at an output side of the gas combustion engine and for generating a prevailing gas/air ratio signal to be supplied to the assembly.

* * * * *